United States Patent [19]
Ebert

[11] 3,824,676
[45] July 23, 1974

[54] METHOD OF APPLYING A REMOVABLE COVER TO AN ELECTRICAL INSULATOR BUSHING

[76] Inventor: Lloyd A. Ebert, 2349 Meadow Ln., Green Bay, Wis. 54301

[22] Filed: Nov. 15, 1972

[21] Appl. No.: 306,710

[52] U.S. Cl............... 29/450, 29/235, 150/52 R, 174/5 R, 174/139, 294/19 R, 294/92
[51] Int. Cl.................................................. H01b
[58] Field of Search............ 174/1, 5 R, 136, 138 R, 174/138 F, 139; 29/426, 427, 450, 235, 235.5, 236

[56] References Cited
UNITED STATES PATENTS

| 992,738 | 5/1911 | Marshall | 174/5 R |
|---|---|---|---|
| 1,435,311 | 11/1922 | Knight | 174/5 R UX |
| 1,967,014 | 7/1934 | Taverner | 174/5 R |
| 1,990,763 | 2/1935 | Walper | 29/235 X |
| 2,193,128 | 3/1940 | Gammeter | 29/235 UX |
| 2,205,039 | 6/1940 | Johns | 174/5 R |
| 3,079,457 | 2/1963 | Newcomb, Jr. | 174/5 R |
| 3,133,984 | 5/1964 | Farough et al. | 174/5 R |
| 3,250,050 | 5/1966 | Finger et al. | 29/235 X |
| 3,270,120 | 8/1966 | VanName et al. | 174/1 |
| 3,319,332 | 5/1967 | Finger et al. | 29/450 |

Primary Examiner—Laramie E. Askin
Attorney, Agent, or Firm—Alfred H. Plyer, Jr.

[57] ABSTRACT

A bushing cover with an application tool and the method of employing them to cover bushings in a multi-KV high voltage electrical system so as to allow painting, sandblasting and other maintenance operations of the system to be performed without shutting off the power to the system, damaging the bushings, or endangering workmen.

2 Claims, 5 Drawing Figures

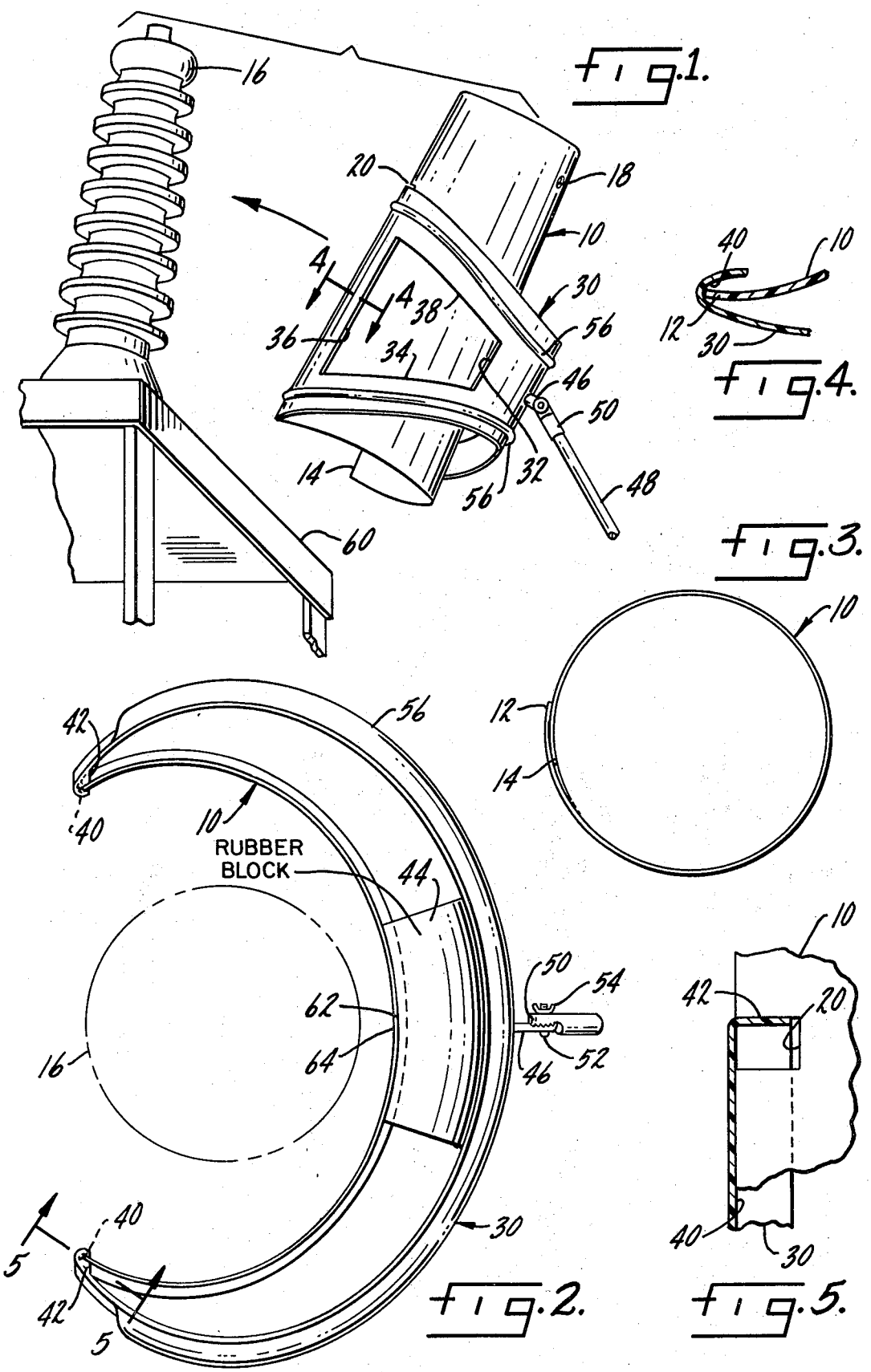

METHOD OF APPLYING A REMOVABLE COVER TO AN ELECTRICAL INSULATOR BUSHING

SUMMARY OF THE INVENTION

The present invention is in the field of maintenance of multi-KV high voltage distribution systems and relates to a bushing cover with an application tool and a method for covering the bushings during maintenance operations on the system.

A primary object is a method for covering the bushings during maintenance operations on the remaining system by use of a bushing cover with an application tool without shutting off the power to the system.

Another object is a method for covering the bushings during maintenance operations that can be performed by a workman with minimum equipment and without endangering himself.

Another object is a bushing cover with an application tool and a method for covering the bushing that protects the bushing during painting, sandblasting and other maintenance operations.

Another object is a bushing cover with an application tool and a method for covering a bushing that allows for easy removal of a bushing cover without shutting off the power to the system.

Another object is a bushing cover with an application tool and a method for covering a bushing of an electrical system that requires only one application tool to install a number of bushing covers.

Another object is a bushing cover with an application tool and a method for covering bushings that allows a bushing cover to be re-useable.

Another object is an application tool that may be used to apply bushing covers of various sizes.

Other objects will appear from time to time in the ensuing specification, drawings and claims.

BRIEF DESCRIPTION OF THE DRAWINGS

FIG. 1 is a view of a bushing cover supported in an application tool positioned near the bushing to be covered;

FIG. 2 is a top view of the bushing cover and application tool being positioned around the bushing;

FIG. 3 is a top view of the bushing cover;

FIG. 4 is a partial sectional view along line 4—4 of FIG. 1; and

FIG. 5 is an enlarged sectional view along line 5—5 of FIG. 2.

DESCRIPTION OF THE PREFERRED EMBODIMENT

The bushing cover 10 shown in FIGS. 1 through 5 is a resilient sleeve that is split longitudinally with edges 12 and 14 overlapping. The bushing cover 10 may be spread open so that edges 12 and 14 are separated. If the edges are not clamped or retained in the separated position, the resilient sleeve will return to its normal closed position with edges 12 and 14 over-lapping as in FIG. 3. A resilient electrically non-conductive material such as glassfibers impregnated with synthetic thermosetting resins is satisfactory for fabricating the bushing cover 10.

The bushing cover 10 is approximately the length of the bushing and is slightly tapered so as to be wider across the bottom than at its top to conform to the general shape of the bushing 16 of FIG. 1 that it covers. A typical bushing is in the range of two to four feet in length. A hole 18 is provided near the top of the bushing cover 10 and approximately midway between the edges 12 and 14 of the bushing cover 10 to allow removal of the bushing cover when positioned on the bushing 16 as will be explained in detail hereinafter. A notch 20 along each of the edges 12 and 14 shown in FIGS. 1 and 5 is included in the bushing cover 10 to provide a locking action when placed in the applicator tool 30 as described later.

The applicator tool 30 shown in FIGS. 1, 2, 4 and 5 has a generally crescent-shaped cross section. The separation between the inwardly curled edges of the crescent of the applicator tool 30 is larger than the diameter of the bushing 16 to be covered so as to allow easy positioning around the bushing during application. Glass fibers or another electrically non-conductive material impregnated with synthetic thermosetting resins is satisfactory for fabricating the applicator tool 30. Material is removed from each side of the applicator tool 30 so as to form trapezoidal cutouts defined by edges 32, 34, 36, and 38. These cutouts allow the applicator tool 30 to be more flexible and lightweight. The side edges of the applicator tool 30 are curled or turned inwardly to form channels 40 to accept the edges 12 and 14 of the bushing cover 10. The channels 40 of the applicator tool 30 are closed off at the top of the applicator tool 30 by lips 42. Mounted approximately midway between the edges of the applicator tool 30 and about halfway up its height is a cylinder or block 44 of a soft material such as rubber which helps to retain the bushing cover 10 in the applicator tool 30 during application to the bushing 16. Mounted on the outside of the applicator tool 30 is a ratchet fitting 46. The ratchet fitting 46 is designed to fit a universal pole 48 which has a matching ratchet fitting 50. The connection of the fittings 46 and 50 is accomplished by means of a bolt 52 placed through holes in the fittings and a wing nut 54. The applicator tool 30 also includes reinforcing ribs 56 that extend around the perimeter of the applicator tool 30 to add further strength.

To apply the bushing cover 10 to the bushing 16 atop a platform 60 of a high voltage electrical distribution system, the bushing cover 10 is partially unrolled by flexing its edges 12 and 14 outwardly so as to fit within the channels 40 of the applicator tool 30 as shown in detail in FIG. 4. The bushing cover 10 is positioned in the applicator tool 30 so that the notches 20 lock on the lip portions 42 of the channels 40 as shown in detail in FIG. 5. The partially unrolled bushing cover 10 is then supported and retained by the applicator tool 30. The bushing cover 10 contacts the soft block or cylinder 44 along its length at 62 to aid in preventing the bushing cover 10 from slipping out of the applicator tool 30. This provides more flexibility in maneuvering the combination during application.

By means of the attached pole 48, the applicator tool 30 with retained bushing cover 10 is lifted upwards and positioned around the bushing 16 as shown in FIGS. 1 and 2. In FIG. 2 it can be seen that as the applicator tool 30 is moved further towards the bushing 16, the bushing 16 will contact the bushing cover 10 at 64. As the maintenance man or operator exerts more force on the pole 48, thereby pushing the bushing cover 10 against the bushing 16, the bushing cover 10 deforms the cylinder or block 44. The edges 12 and 14 of the bushing cover 10 are pulled out of the channels 40 of the applicator tool 30. After a certain amount of deformation of the bushing cover 10 and the cylinder block 44, the edges 12 and 14 snap out of the channels 40 and the previously flexed bushing cover 10 returns to its normally unflexed, rolled-up position as shown in FIG. 3, fully enclosing the bushing 16 with edges 12 and 14 overlapping. Since the bushing cover 10 closes around the bushing 16, the overall closed diameter of the bushing cover 10 is not substantially greater than the bushing 16. The applicator tool 30 may now be withdrawn from the same direction that it was lifted to apply the bushing cover 10.

The bushing 16 is now protected allowing the performance of various maintenance functions, such as sandblasting and painting. It will be noted that the power did not have to be shut off because the workman or maintenance operator did not have to approach the bushing 16 except by means of the insulating pole 48 and the applicator tool 30. The bushing cover 10 can be removed when the maintenance is finished. The only time that the power has to be shut off is to perform maintenance operations on the bushing itself.

To remove the bushing cover 10, a pole with some form of a hook on the end may be lifted up to the bushing cover 10 and inserted in hole 18. The bushing cover may now be easily removed by drawing the pole backwards pulling the bushing cover 10 against the bushing 16. This unflexes the edges 12 and 14 of the bushing cover 10 allowing the bushing cover to slide off the bushing 16. The bushing cover 10 may now be lowered to the ground where it may be reinserted in the applicator tool for a further application or stored until the next maintenance operation.

Whereas the preferred form of the invention has been shown and described herein, it should be noted that there may be many modifications, alterations and substitutions thereto without departing from the teachings of this invention.

I claim:

1. A method for covering and protecting an elongated, cylindrical, generally upstanding bushing of a high voltage electrical system during maintenance operations performed on the system while the power remains "ON", including the steps of:
   spreading apart the longitudinal edges of a longitudinally split sleeve of electrically nonconductive resilient material a sufficient distance along the entire length of said sleeve to permit said bushing to pass between said edges and into said sleeve,
   mounting said spread-apart resilient sleeve in an applicator which releasably grips the spread-apart edges of said sleeve,
   positioning said applicator and mounting sleeve to locate said sleeve in a generally upstanding position alongside said bushing with the spread-apart longitudinal edges thereof facing said bushing,
   moving said applicator and sleeve toward said bushing until the bushing passes between said spread-apart longitudinal edges of said sleeve and contacts said sleeve, and
   continuing movement of said applicator and sleeve in the same direction until the force exerted against the sleeve by the bushing releases said sleeve from the applicator and said sleeve is permitted to assume its normal cylindrical shape to surround said bushing coaxially therewith.

2. The method of claim 1 in which the longitudinal edges of said sleeve are moved into overlapping position when said sleeve surrounds said bushing.

* * * * *